Sept. 19, 1933.      H. A. BRASSERT ET AL      1,927,486
GAS WASHING APPARATUS
Filed Nov. 20, 1931      3 Sheets-Sheet 2

Inventors:
Herman A. Brassert
Frederick W. Barrett
John P. Grilli

Sept. 19, 1933.  H. A. BRASSERT ET AL  1,927,486
GAS WASHING APPARATUS
Filed Nov. 20, 1931   3 Sheets-Sheet 3

Patented Sept. 19, 1933

1,927,486

UNITED STATES PATENT OFFICE 1,927,486

GAS WASHING APPARATUS

Herman A. Brassert, Frederick W. Barrett, and John P. Grilli, Chicago, Ill., assignors to H. A. Brassert & Company, Chicago, Ill., a corporation of Illinois Application November 20, 1931
Serial No. 576,288

10 Claims. (Cl. 261—89)

This invention relates to cleaning of gases and particularly to the cleaning of gases from industrial furnaces, such as blast furnace gas containing finely divided solids and fumes which are difficult to remove to the desired degree in the ordinary stationary washers.

The method of treating such gases commonly practiced at blast furnace plants, is to first remove the heavier solids by passing the stream of hot gas through large dry dust catchers, then sometimes passing the same through dry centrifugal cleaners, then cooling and pre-cleaning it in spray towers and finally fine cleaning it in mechanical washers, generally of the disintegrator type.

The fine cleaning operation is the most expensive step as it requires considerable power, in some cases more than 10 horse power per thousand cubic feet of gas, in accordance with the quality of the gas and the degree of final cleanliness which is desired.

For this reason, there exists a demand for an apparatus which cleans the gas to a satisfactory degree, for many purposes of use, without consuming so much power.

The gas leaving the present stationary washers is not clean enough for any mechanical use as it generally contains at least .2 grains of dust per cubic foot, and in many instances it is not possible to hold this average degree of cleanness over an extended period of time. The gas leaving the spray towers also carries a high amount of entrained moisture. This moisture together with the remaining dust content is thrown down in the gas mains, valves and burners, with the resultant expense for keeping these parts clean, in addition to producing a detrimental effect on the efficiency of combustion of such gases.

It is one of the objects of the present invention to so improve tower washers that they will clean blast furnace gas to a cleanliness of result .1 grains per cubic foot, with less than 1 horse power per thousand cubic feet of gas treated. This is accomplished by providing revolving beater bars in the upper portion of a stationary washer.

Such tower washers generally contain wooden hurdles or baffles through which the gas passes upwardly in finely divided streams against the down flowing water, in counter-current manner, the hot gases entering the bottom, and the cold, washed gases leaving at the top; the cold water on the other hand, entering at the top, generally through multiple spray nozzles, and the warm, dirty water being discharged at the bottom.

The baffle elements contained in the tower are generally arranged in zones, that is successive zones from the bottom upwardly, being designed for progressively finer cleaning, but complete cleaning by spraying in the hurdles or baffles is not attained because the spray and dripping water, cascading through the hurdles or baffles, has not sufficient kinetic energy to overcome the tendency of the gases to push the water to one side; as a result a portion of the gases travels up through relatively dry channels.

We are well acquainted with tower washers which embody revolving sprays for better contact between the water and gas, in which the water is thrown out into the stream of gas by centrifugal force from revolving elements, but in these washers no beating together of the gas and water takes place, and at the speed at which the great volume of gases flow upwardly, the gases still dominate the distribution of the water, throwing it promiscuously by reason of their superior kinetic energy, with the result that with such means it has been impossible to clean blast furnace gases to the desired degree of cleanliness.

Furthermore, such washers employ the mechanical means in their lower sections where the gases still contain most of their dust and have not been sufficiently cooled. This results in the use of an excessive amount of water and expensive repairs as well as additional power.

In the present invention, mechanical means are provided in the top of the tower, which forcibly compel the gases and water to pass together through rapidly revolving beater bars, which thoroughly beat and mix the gas, water and dust, with the result that very complete cleaning takes place.

This invention, therefore, combines the advantages of efficient cooling and pre-cleaning, by the embodiment of the counter-current principle in the stationary section of the tower, with those of a mechanical beater, which compel a positive and thorough mechanical scrubbing of the gases and the cleaning fluid.

To the attainment of these ends and the accomplishment of other new and useful objects as will appear, the invention consists in the features of novelty, in substantially the construction, combination and arrangement of the several parts hereinafter more fully described and claimed and shown in the accompanying drawings illustrating this invention and in which Figure 1 is a vertical, longitudinal, sectional view of a gas washing apparatus of this character constructed in accordance with the principles of this invention, with parts in elevation and with parts broken away.

Figures 1, 6:
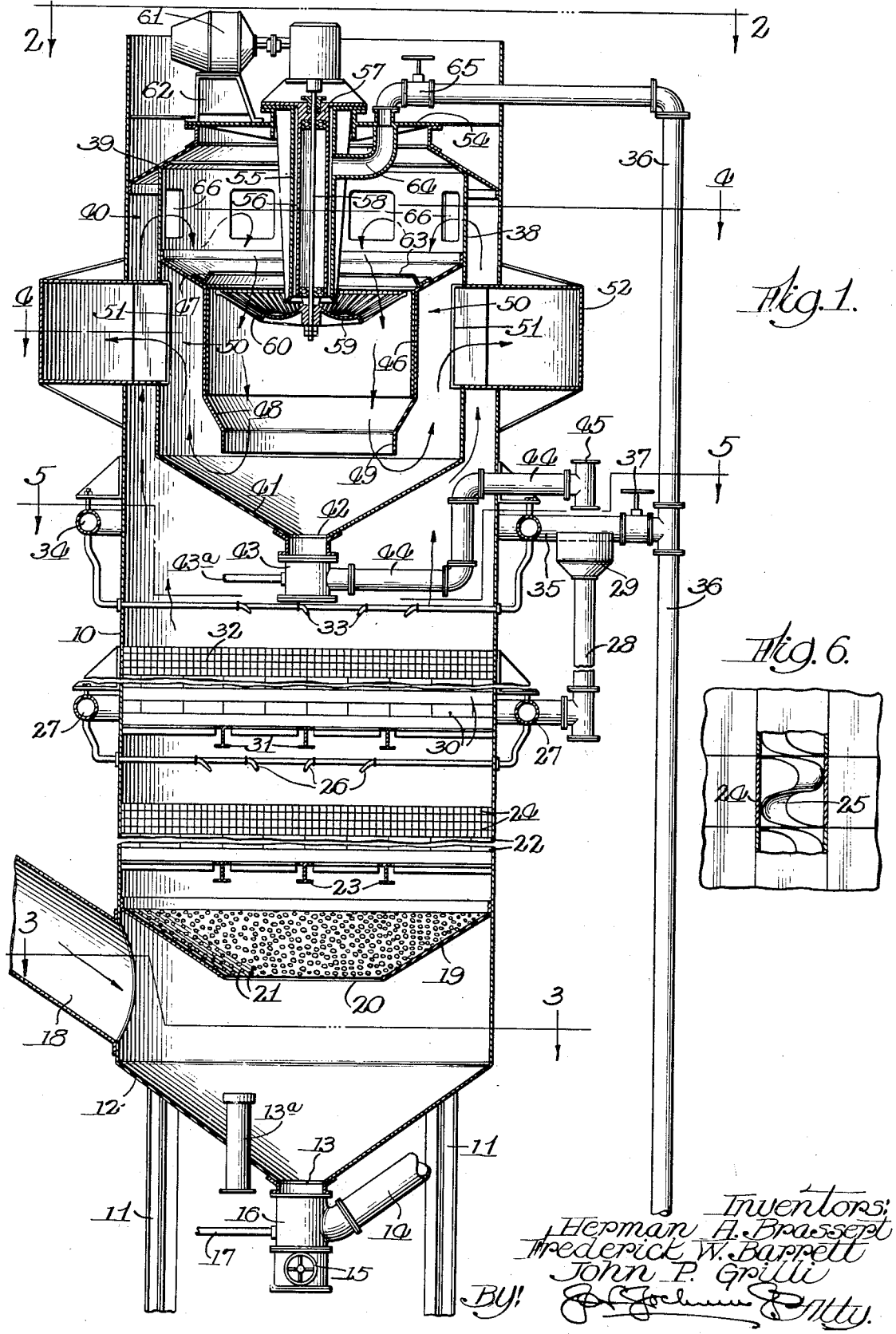
Figure 6 is a detail sectional view of the preferred form of ceramic tile.
Figure 2:
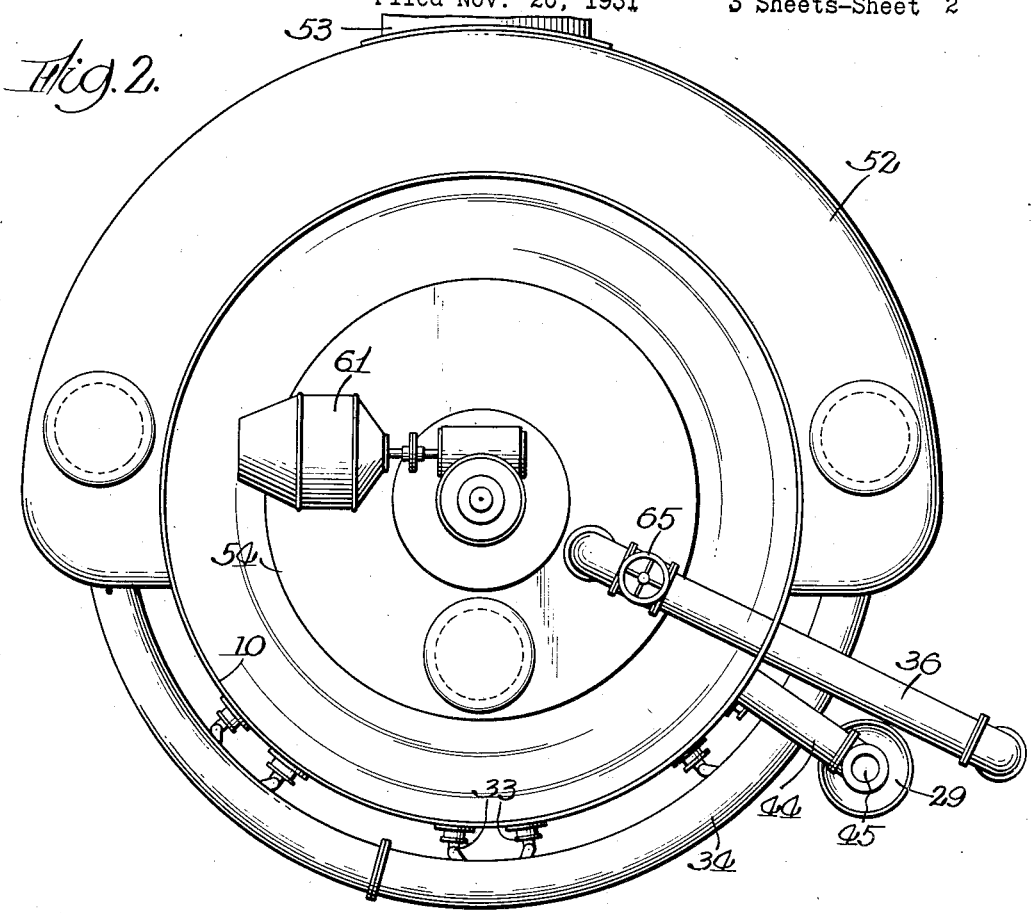
Figure 2 is a view of Figure 1, as taken on line 2—2, Figure 1.
Figure 3:
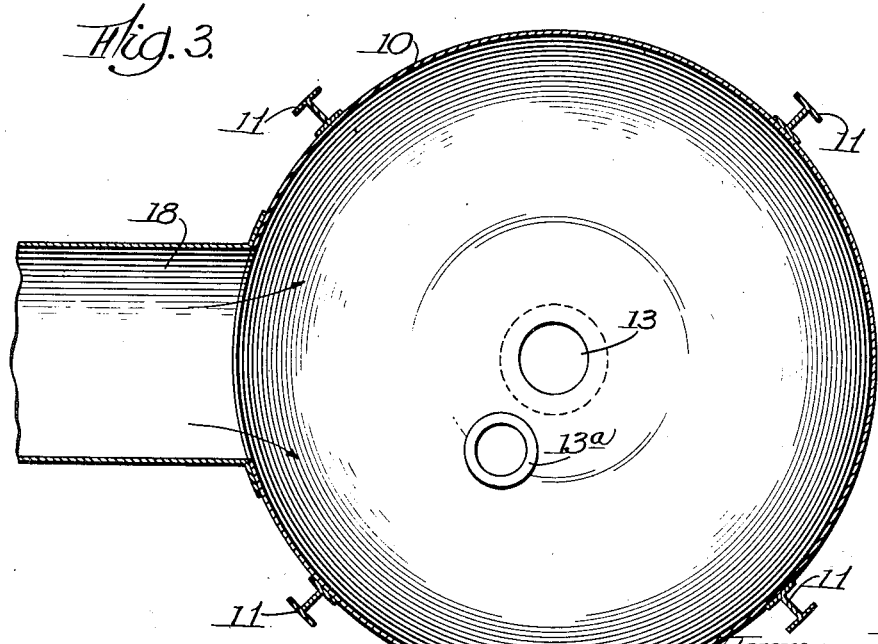
Figure 3 is a sectional view taken on line 3—3, Figure 1.
Figure 4:
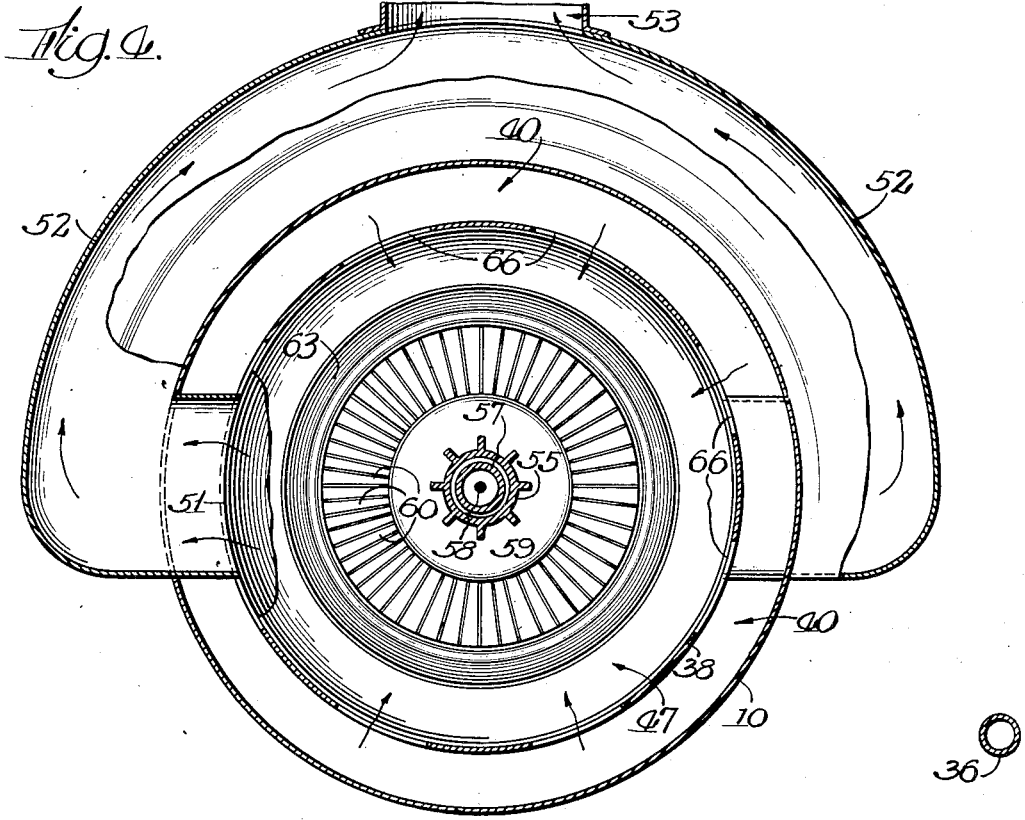
Figure 4 is a sectional view taken on line 4—4, Figure 1.
Figure 5:
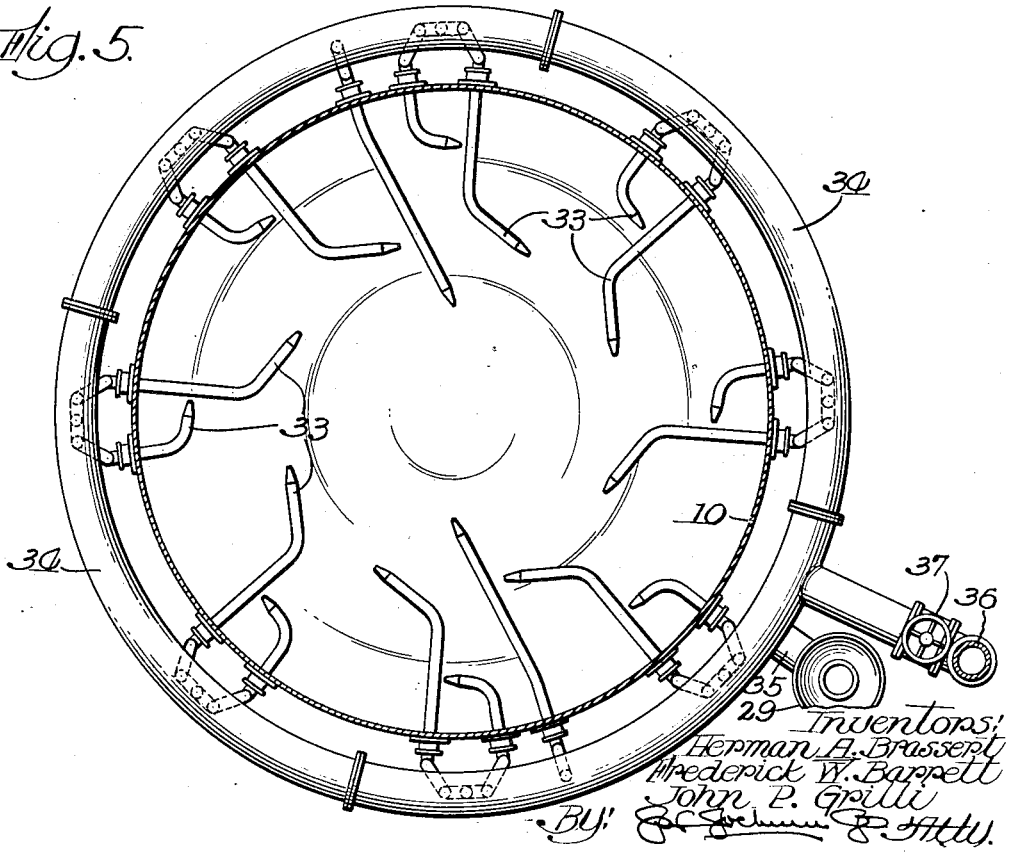
Figure 5 is a sectional view taken on line 5—5, Figure 1.

Referring more particularly to the drawings, the numeral 10 designates generally a casing of any desired size and configuration and of any desired height, and constitutes a vertical tower within which the mechanism is arranged. The tower is supported in any desired or suitable manner such as by means of supports 11 and the bottom thereof is preferably conical as at 12, so as to direct the deposits of foreign matter through an opening 13 to be discharged through a discharge pipe 14, a valve 15 being preferably arranged in the outlet pipe 16 so as to control the open end of the pipe, if desired. Leading into the pipe 16 is a pipe 17 through which fluid under pressure may be discharged into the pipe 16 when desired to clean out the same.

The gas to be cleaned is admitted into the bottom of the tower through a supply pipe 18 and is delivered beneath a distributor or baffle plate 19 preferably in the form of an inverted cone having an opening 20 and perforations 21 in the wall thereof. The gas flowing into the casing 10 passes through the distributor or baffle 19 and flows upwardly through a series of superposed baffles or hurdles 22, which latter are supported by means of suitable supports 23. Any number of these baffles 22 may be provided and supported above the baffles are a series of rows of tile 24, preferably ceramic, which are tubular and are provided with a spiral rib 25 therein, so that as the gases pass therethrough, there will be insured a better distribution of the water and gas, and thorough washing in the stationary elements.

Arranged above the tile 24 are a series of spray nozzles 26 through which water is sprayed upon the tile 24 and baffles 22, flowing downwardly in counter-current to the upwardly flowing gases. Water is supplied to the nozzles 26 preferably from a header 27 which receives its supply of water from a pipe 28 having a funnel or enlarged inlet opening 29, in a manner to be hereinafter described.

Arranged above the baffles and tile 24 and also above the spray nozzles 26, being spaced therefrom, is another series of baffles 30 supported by means of suitable supports 31 and having superposed thereupon another series of ceramic tile 32, similar to the tile 24.

Disposed above and spaced from the tile 32 are another series of spray nozzles 33 for spraying water over the tile 32 and baffles or hurdles 30 in counter-current to the flow of gases passing therethrough. Water is supplied to the nozzles 33 from a header 34, which in turn receives its supply of water from a pipe 35 connected to a supply pipe 36, which latter in turn is connected to any suitable source of supply of water, a valve 37 being provided in the pipe 35 to control the amount of water delivered through the nozzles 33.

Arranged above the baffles and tiles 30—32 and the nozzles 33 is a casing 38 which is supported in any suitable manner preferably by means of a member 39, adjacent the top of the tower, and the casing 38 is of an external diameter considerably smaller than the internal diameter of the adjacent portion of the outer casing 10 so as to form a passage 40 between the casing 38 and the outer casing 10. This casing may be of any desired diameter and of any desired height, the bottom 41 thereof being preferably conical to drive foreign matter through a discharge opening 42 into a pipe or receptacle 43, from which latter a discharge outlet or pipe 44 leads, and the extremity 45 of the outlet pipe 44 is disposed adjacent and preferably spaced slightly above the funnel or enlarged portion 29 of the pipe 28, so that the water discharged into the casing 38 will flow therefrom through the outlet 42 and thence through the pipe 44, to be delivered through the outlet 45 into the pipe 28, to be directed to the header 27 and from thence through the spray nozzles 26, over the lower series of stationary baffles or hurdles in the casing 10. By spacing the end of the outlet 45 above the inlet of the pipe 28 a sight opening will be provided for inspecting the delivery of the water from the casing 38 into the pipe 28.

Within the casing 38 is arranged another casing 46 which is of considerably smaller external diameter than the internal diameter of the adjacent portion of the casing 38 and the upper portion of the casing 46 is preferably enlarged by means of a flaring extremity 47 which is secured to the wall of the casing 38 and forms a means of support for the casing 46. The lower extremity of the casing 46 is provided with a tapered reduced portion 48 and is open at the bottom as at 49, the extremity of the casing 46 terminating considerably short of the tapered bottom 41 of the casing 38, and the casing 46 forming with the casing 38 a passage 50, through which the gas will pass to be delivered through openings 51 into a header or drum 52 and from there through a discharge outlet 53 to the point of use.

The openings 51 are preferably equally distant from each other to balance the pull of the gas through the beater bars, later described.

The casing 38 is closed at its top as at 54 and projecting thereinto through the closed top and at the center of the casing 46 is a tubular member 55 which terminates in proximity to but slightly beyond the bottom of the flared portion 47 of the casing 46. The external diameter of the tubular member 55 is considerably less than the internal diameter of the casing 46 and arranged within the tubular member 55 but spaced therefrom to form a passage 56, is a bearing 57, in which is journaled a shaft 58 to which is secured a beater member 59.

Any form of beater member suitable for this purpose may be employed, such for instance as the beater member disclosed in United States Patent 1,766,588, issued June 24, 1930, to Edwin M. Bassler, Patent 1,767,628, issued June 24, 1930, to E. Von Maltitz, or Patent 1,766,267, issued June 24, 1930, to H. A. Strain, suffice it to say that the beater member is provided with spaced bars or members 60, between which the gas and water are forced to pass so as to be beaten up and thoroughly intermixed, and at the same time thrown out by centrifugal force against the wall of the casing 46. The shaft 58 with the beater and spraying member 59—60 carried thereby is adapted to be rotated at any desired speed and in any suitable manner, but preferably by means of a motor 61 connected with the shaft 58, the motor being mounted upon a suitable support 62.

Encompassing the casing 46 at the top thereof and the periphery of the beater member 59, is a shield or flange 63 which co-operates with the flanged portion 47 of the casing 46 to form a dam for the water which accumulates upon the portion 47, and the edge of the member 63 is disposed in such a manner with respect to the periphery of the beater and sprayer member 59 that water flowing thereover and passing between the periphery of the beater and sprayer member 59 and the adjacent portion of the wall of the casing 46 will form a seal between the periphery of the beater member and the casing wall to prevent the escape of gases passing upwardly therethrough.

Water is supplied to the beater member from the supply pipe or main 36 which has a connection as at 64 with the passage 56 between the tubular member 55 and the bearing 57 of the shaft 58, and a valve 65 may be provided in the supply pipe for controlling the amount of water delivered into the tubular member 55. Water flowing through the pipe 36 when the valve 65 is opened, will be delivered from the tubular member 55 on to the beater and sprayer member 59.

The member 39 forms a closure for one end of the space or passage 40 between the casing 38 and the outer casing 10, and the gas which passes up into such space will be delivered therefrom through passages or openings 66 in the wall of the casing 38, above the beater and sprayer member 59 and will be forced downwardly with the water through the beater member 59, at the same time being thoroughly mixed with the water.

The water will then gravitate to the bottom of the casing 38 to be discharged through the pipe 44, thence through the discharge outlet 45 into the pipe 28, to the header 27, from which the spray nozzles 26 receive their supply.

The gas will also pass with the water, being forced downwardly through the bottom of the casing 46 the diameter of the outlet of which casing is of a relatively small radius or cross section as compared with the diameter of the casing 38, the outlet of the casing 46 being disposed at substantially the center of the casing 38, and as it passes out of the casing will make a direct or sharp change in the direction of flow and will flow upwardly into the space 50 between the casing 46 and the casing 38, out of the openings 51 into the header 52.

By this quick change in the direction of flow of the gas to enter the space or passage 50, all moisture will be eliminated from the gas.

The stationary hurdles or baffles employed in this apparatus are preferably of the usual construction and are arranged in superposed tiers, each tier being provided with any desired number of layers of spiral ceramic tile.

In the operation of the device the gas enters through the inlet 18 and will flow upwardly through the tower 10 to be discharged therefrom through the outlet 53 leading from the drum or header 52.

The water will flow in counter-current to the gas and the water will be directed into the tower at the top thereof and will flow downwardly to be discharged at the bottom of the tower through the outlet pipe 14.

The beater bars carried by the member 59 are preferably inclined at an angle extending upwardly and the water is fed to the beater member 59 centrally around its shaft and is thrown outwardly into the bars or members 60 by centrifugal force, preferably created by a revolving center portion which is located directly below the passage 56.

The flow of the gas will be upwardly through the stationary hurdles or baffles and through the tiles in counter-current to the down flowing water and will pass into the space or passage 40 between the inner casing 38 and the outer casing 10, thence through the inlet openings 60 and then downwardly in contact with the beater and sprayer members 59, meeting the water and being forced therewith through the beater bars or members and thrown outwardly by centrifugal force into the casing 46. The mixed water and gas will then be forced downwardly out of the casing 46, the water gravitating to the bottom of the casing 38 to flow out of the outlet pipe 44. After the mixed gas and water pass out of the casing 46, the direction of flow of the gas will be quickly reversed or changed so that the gas will rise outside of the casing 46 and into the space 50 between the casings 46 and 30, the moisture in the gas precipitating from the gas during its flow through the passage 50. The gas then passes into the drum or header 52. By the change of the course or direction of flow of the gas all entrained moisture will precipitate therefrom and a very dry gas will result.

The eliminated water together with the discharge from the stage, which will in the claims be indicated as the mechanical section, will be reused in the stationary sections of the tower and which are located beneath the mechanical section. The water is collected in the cone shaped bottom 41 of the casing 38 and is then fed to the spray nozzles above one of the tiers or sections of stationary baffles or hurdles so as to take advantage of the natural head for feeding the spray nozzles.

While the preferred form of the invention has been herein shown and described, it is to be understood that various changes may be made in the details of construction and in the combination and arrangement of the several parts, within the scope of the claims, without departing from the spirit of the invention.

What is claimed as new is:—

1. A gas washing tower provided with a gas inlet adjacent the bottom and a gas outlet adjacent the top, stationary scrubbing hurdle elements arranged in the lower section of the tower, and mechanically operated scrubber elements in the upper section of the tower, the last said elements consisting of revolving beater bars between which gas and water are forced in concurrent flow downward.

2. A vertical washer provided with a gas inlet adjacent its bottom and a gas outlet adjacent its top, means for feeding water into the top of the washer, a discharge outlet for the water adjacent the bottom, stationary hurdle washing elements in the lower section of the washer, and revolving mechanical beater bars for the gas and water arranged above the said stationary washing elements, the water discharging from the section in which the beater bars are arranged being distributed by spray nozzles and reused in the lower sections in which the stationary washing elements are arranged.

3. A gas washer consisting of a vertical casing containing stationary hurdle cleaning elements in its lower portion, one or more layers of ceramic tile superposed upon said elements, revolving mechanical beater bars in the upper section of the casing, means for forcing gas and water downward in parallel currents between said beater bars, and means for causing the fine cleaned gas to suddenly change its direction of flow within the washer thereby causing the gas to drop the entrained moisture therefrom.

4. A vertical tower washer containing stationary cleaning elements in its lower section, and a passage for the pre-cleaned gas in its upper section, said passage being between and formed by the outer gas washer shell and an interior shell, and revolving beater elements housed by said interior shell.

5. A vertical tower washer provided with stationary hurdle elements in its lower section for rough cleaning the gas, revolving beater bars in the upper section of the washer for fine cleaning the gas and between which bars the water and gas pass downward in parallel currents, and means for reversing the direction of flow of the current of the finely cleaned gas with the washer for drying the same.

6. A vertical tower washer consisting of stationary scrubbing elements in the lower section, mechanical scrubber elements in the upper section, said mechanical elements consisting of revolving beater bars between which gas and water are forced to pass downward in parallel currents in the mechanical section, the passages formed between said bars being circular and having the center line of the washer their common axis.

7. A vertical tower washer consisting of stationary scrubbing elements in the lower section, and mechanical scrubber elements in its upper section, said mechanical scrubber elements consisting of revolving beater bars, one or more inlets for discharging the gas from the lower section into the upper section, each of said inlets being equally distant from the vertical center of the tower washer.

8. A vertical tower washer containing in its lower section stationary scrubbing elements and in its upper section mechanical scrubbing elements, said mechanical elements consisting of revolving beater bars between which gas and water are forced together, a passage for reversing the direction of flow of the gas after passing the revolving beater bars, and one or more clean gas outlets for the clean dry gas, each of the said outlets being equally distant from the center line of the washer.

9. A vertical tower washer consisting of two or more stationary scrubbing stages, means for supplying each stage with water from separate sprays, a mechanical stage superposed above the said scrubbing stages, said mechanical stage consisting of revolving beater bars, a subsequent moisture eliminating stage, and gas inlets and outlets in said mechanical stage, all of said gas inlets and gas outlets being equally distant from the vertical center line of the washer.

10. A gas washing tower provided with a gas inlet adjacent the bottom and a gas outlet adjacent the top, stationary hurdle scrubbing elements arranged in the lower section of the tower through which the gas passes counter-current to descending wash water, mechanically operated scrubbing elements in the tower above said hurdle, spray nozzles for supplying water for performing the first stages of the washing in the lower hurdle section, and means for collecting the wash water from the said mechanical section and delivering the same to said nozzles for washing the gas in the lower section.

HERMAN A. BRASSERT.
FREDERICK W. BARRETT.
JOHN P. GRILLI.